(12) United States Patent
Luo

(10) Patent No.: US 9,407,850 B2
(45) Date of Patent: Aug. 2, 2016

(54) IMAGE SENSOR AND ADJUSTMENT METHOD THEREOF

(71) Applicant: Silicon Optronics, Inc., Hsinchu (TW)

(72) Inventor: Xiaodong Luo, Hsinchu (TW)

(73) Assignee: SILICON OPTRONICS, INC., Hsinchu (TW)

( * ) Notice: Subject to any disclaimer, the term of this patent is extended or adjusted under 35 U.S.C. 154(b) by 57 days.

(21) Appl. No.: 14/316,282

(22) Filed: Jun. 26, 2014

(65) Prior Publication Data

US 2015/0077604 A1    Mar. 19, 2015

(30) Foreign Application Priority Data

Sep. 18, 2013  (TW) .............................. 102133803 A

(51) Int. Cl.
*H04N 5/335* (2011.01)
*H04N 5/378* (2011.01)

(52) U.S. Cl.
CPC .............. *H04N 5/378* (2013.01); *H04N 5/335* (2013.01)

(58) Field of Classification Search
USPC ........................................................ 348/300
See application file for complete search history.

(56) References Cited

U.S. PATENT DOCUMENTS

| 2007/0007438 | A1* | 1/2007 | Liu | ........................ | H04N 5/243 250/214 AG |
| 2008/0094271 | A1* | 4/2008 | Tooyama | ............ | H03M 1/0607 341/155 |
| 2010/0073525 | A1* | 3/2010 | Lee | ........................ | H04N 5/365 348/247 |

* cited by examiner

*Primary Examiner* — Roberto Velez
*Assistant Examiner* — Stephen Coleman
(74) *Attorney, Agent, or Firm* — Muncy, Geissler, Olds & Lowe, P.C.

(57) ABSTRACT

An image sensor is provided. The image sensor includes a pixel array, a sense amplifier, an analog-to-digital converter, a processor and a voltage generator. The sense amplifier obtains a first signal according to a pixel signal from the pixel array and a reference voltage, wherein the reference voltage has a first voltage level. The analog-to-digital converter converts the first signal into a first digital signal. The processor provides a feedback signal according to the first digital signal. The voltage generator adjusts the reference voltage to a second voltage level corresponding to the feedback signal. The sense amplifier removes a direct current (DC) bias voltage from the pixel signal according to the reference signal having the second voltage level.

13 Claims, 3 Drawing Sheets

IMAGE SENSOR AND ADJUSTMENT METHOD THEREOF

CROSS REFERENCE TO RELATED APPLICATIONS

This Application claims priority of Taiwan Patent Application No. 102133803, filed on Sep. 18, 2013, the entirety of which is incorporated by reference herein.

BACKGROUND OF THE INVENTION

1. Field of the Invention

The invention relates to an image sensor, and more particularly to an image sensor capable of signal-range adjustment.

2. Description of the Related Art

A semiconductor image sensor (e.g. a charge-coupled device (CCD) or a complementary metal oxide semiconductor (CMOS) sensor), commonly implemented in a camera or a camcorder, is used to convert visible light images into electronic signals, so as to perform subsequent storage, transmission or display.

In some applications, a pixel array of the image sensor has background light. Thus, in addition to the actual sensed signals, the output signals sensed by the image sensor further comprise a background signal caused by the background light. The background signal has a significant signal energy, thus a high-resolution (high bit number) analog-to-digital converter is needed to convert the images traditionally, so as to effectively identify the actual sensing signals.

BRIEF SUMMARY OF THE INVENTION

An image sensor and an adjustment method thereof are provided. An embodiment of an image sensor is provided. The image sensor comprises a pixel array, a sense amplifier, an analog-to-digital converter, a processor and a voltage generator. The sense amplifier obtains a first signal according to a pixel signal from the pixel array and a reference voltage, wherein the reference voltage has a first voltage level. The analog-to-digital converter converts the first signal into a first digital signal. The processor provides a feedback signal according to the first digital signal. The voltage generator adjusts the reference voltage to a second voltage level corresponding to the feedback signal. The sense amplifier removes a direct current (DC) bias voltage from the pixel signal according to the reference signal having the second voltage level.

Furthermore, an embodiment of an adjustment method for an image sensor is provided. A first signal is obtained according to a pixel signal from a pixel array of the image sensor and a reference voltage having a first voltage level. The first signal is converted into a first digital signal, by an analog-to-digital converter of the image sensor. A feedback signal is obtained according to the first digital signal. The reference voltage is adjusted to a second voltage level corresponding to the feedback signal, by a voltage generator of the image sensor. A direct current (DC) bias voltage is removed from the pixel signal according to the reference voltage having the second voltage level.

A detailed description is given in the following embodiments with reference to the accompanying drawings.

BRIEF DESCRIPTION OF DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
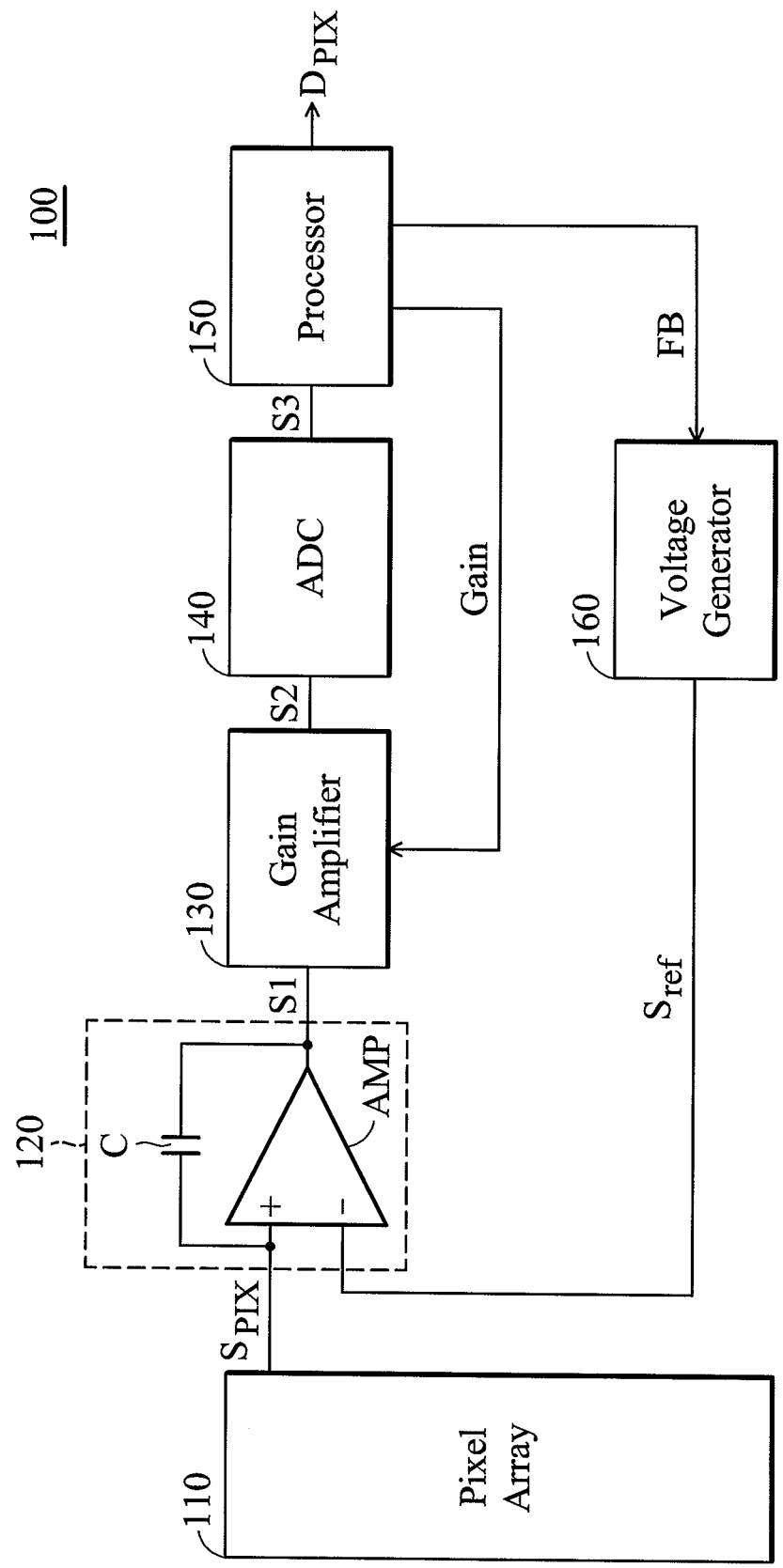
FIG. 1 shows an image sensor according to an embodiment of the invention.

FIG. 1 shows an image sensor 100 according to an embodiment of the invention. The image sensor 100 comprises a pixel array 110, a sense amplifier 120, a gain amplifier 130, an analog-to-digital converter (ADC) 140, a processor 150 and a voltage generator 160. First, the sense amplifier 120 obtains a pixel signal $S_{PIX}$ from the pixel array 110. Next, according to the pixel signal $S_{PIX}$ and a reference voltage $S_{ref}$ from the voltage generator 160, the sense amplifier 120 provides a signal S1 to the gain amplifier 130, wherein the reference voltage $S_{ref}$ has a first voltage level V1, i.e. $S_{ref}=V1$. In the embodiment, the sense amplifier 120 comprises an operational amplifier AMP and a capacitor C, wherein the capacitor C is coupled between an output terminal and a non-inverting input terminal (+) of the operational amplifier AMP. Furthermore, the non-inverting input terminal of the operational amplifier AMP is further coupled to the pixel array 110, to receive the pixel signal $S_{PIX}$. An inverting input terminal of the operational amplifier AMP is coupled to the voltage generator 160 to receive the reference voltage $S_{ref}$. Next, the gain amplifier 130 amplifies the signal S1 to obtain a signal S2 according to a gain signal Gain corresponding to a unity gain, i.e. $S2=S1\times 1$, wherein the gain signal Gain is provided by the processor 150. Next, the ADC 140 converts the signal S2 into a digital signal S3, and provides the digital signal S3 to the processor 150. Next, the processor 150 obtains a background signal according to the digital signal S3. In one embodiment, the background signal is produced by a background light of the pixel array 110. Next, according to the digital signal S3, the processor 150 provides a feedback signal FB corresponding to a signal level of the background signal to the voltage generator 160. Moreover, the processor 150 also provides the gain signal Gain to the gain amplifier 130 according to the digital signal S3. Next, the voltage generator 160 adjusts the reference voltage $S_{ref}$ according to the feedback signal FB, such that the reference voltage $S_{ref}$ has a second voltage level V2, i.e. $S_{ref}=V2$. In one embodiment, the voltage generator 160 is a digital-to-analog converter (DAC). Next, the sense amplifier 120 removes a direct current (DC) component $S_{DC}$ of the pixel signal $S_{PIX}$ according to the reference voltage $S_{ref}$ having the second voltage level, to generate the signal S1. In the embodiment, the DC component $S_{DC}$ is an offset voltage of the pixel signal $S_{PIX}$, wherein the offset voltage is produced by the background signal of the pixel array 110. Next, the gain amplifier 130 amplifies the signal S1 to obtain the signal S2 according to the gain signal Gain, wherein the gain signal Gain has a gain that is greater than the unity gain. Therefore, after the DC component $S_{DC}$ is removed, a signal range of the signal S2 is increased. Next, the ADC 140 converts the amplified signal S2 into the digital signal S3, and provides the digital signal S3 to the processor 150. Next, the processor 150 provides the pixel data $D_{PIX}$ according to the digital signal S3. In the embodiment, by removing the DC component $S_{DC}$ caused by the background signal from the pixel signal $S_{PIX}$, the gain amplifier 130 can amplify the major sensed signal. Thus, the pixel data $D_{PIX}$ having a satisfactory signal level is obtained without using a high-resolution (high-bit number) ADC.

Figure 2:
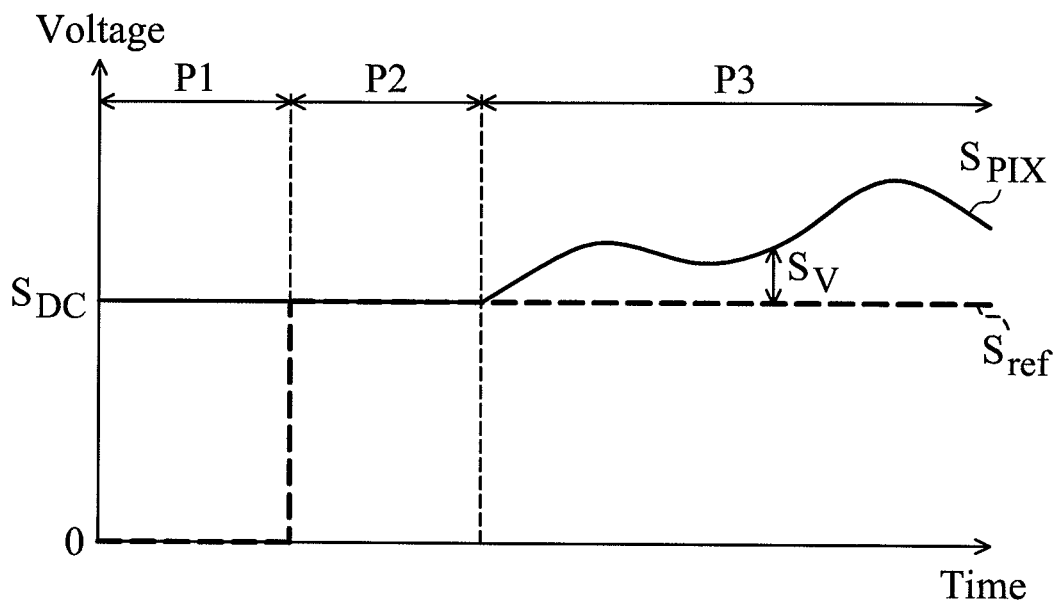
FIG. 2 illustrates a waveform of the pixel signal $S_{PIX}$ and the reference voltage $S_{ref}$ of FIG. 1.
Figure 3:
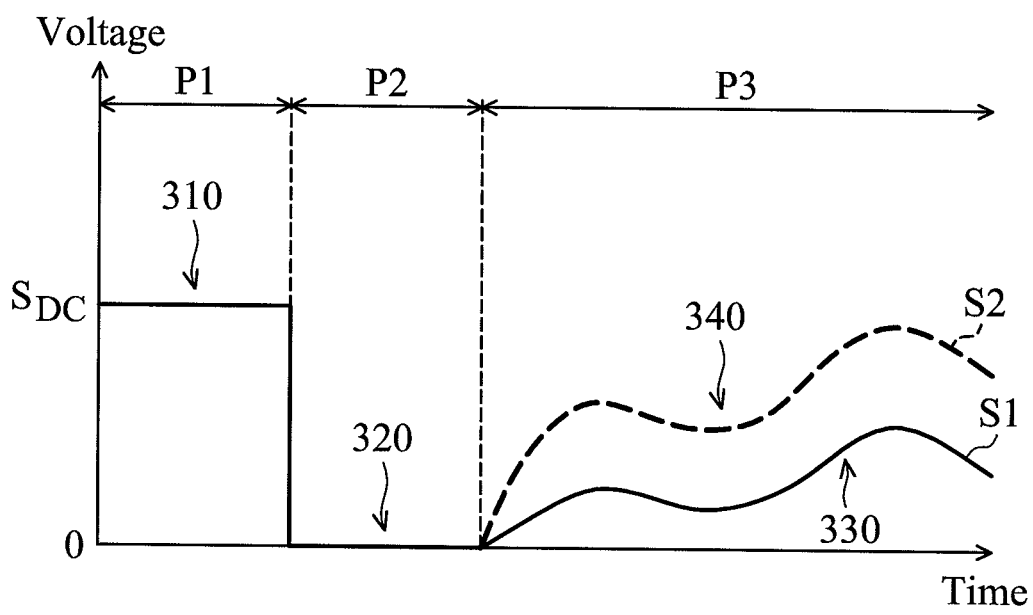
FIG. 3 illustrates a waveform of the signals S2 and S3 of FIG. 1.

FIG. 2 and FIG. 3 show waveform diagrams of the image sensor 100 of FIG. 1, wherein FIG. 2 illustrates a waveform of the pixel signal $S_{PIX}$ and the reference voltage $S_{ref}$, and FIG. 3 illustrates a waveform of the signals S2 and S3. Referring to FIG. 1 and FIG. 2 together, in period P1, the pixel signal $S_{PIX}$ provided by the pixel array 110 only comprises the DC component $S_{DC}$ caused by the background signal. Furthermore, in the period P1, the reference voltage $S_{ref}$ is 0V, i.e. the first voltage level V1 is 0. Thus, the sense amplifier 120 obtains the signal S1 having the DC component $S_{DC}$ according to the pixel signal $S_{PIX}$ and the reference voltage $S_{ref}$, as shown in label 310 of FIG. 3. Therefore, the processor 150 can provide the feedback signal FB corresponding to the DC component $S_{DC}$ and the gain signal Gain to the voltage generator 160 and the gain amplifier 130, respectively. Next, the voltage generator 160 adjusts the reference voltage $S_{ref}$ according to the feedback signal FB, such that the reference voltage $S_{ref}$ is substantially equal to the DC component $S_{DC}$. Thus, in period P2, the sense amplifier 120 removes the DC component $S_{DC}$ from the pixel signal $S_{PIX}$ to obtain the signal S1 according to the reference voltage $S_{ref}$, as shown in label 320 of FIG. 3. Next, in period P3, the pixel signal $S_{PIX}$ provided by the pixel array 110 further comprises a major sensed component S. Because the reference voltage $S_{ref}$ is substantially equal or close to the DC component $S_{DC}$, the sense amplifier 120 can remove the DC component $S_{DC}$ from the pixel signal $S_{PIX}$ to obtain the signal S1 according to the reference voltage $S_{ref}$, wherein the signal S1 is substantially equal or close to the major sensed component $S_V$, as shown in label 330 of FIG. 3. Next, the gain amplifier 130 amplifies the signal S1 to obtain the signal S2 according to the gain signal Gain, as shown in label 340 of FIG. 3. Thus, the ADC 140 can convert the amplified signal S2 into the signal S3. In FIG. 3, the signal S2 has a larger signal range, thus the image sensor can obtain the pixel data $D_{PIX}$ having satisfactory signal level without using a high-resolution (high-bit number) ADC.

Figure 4:
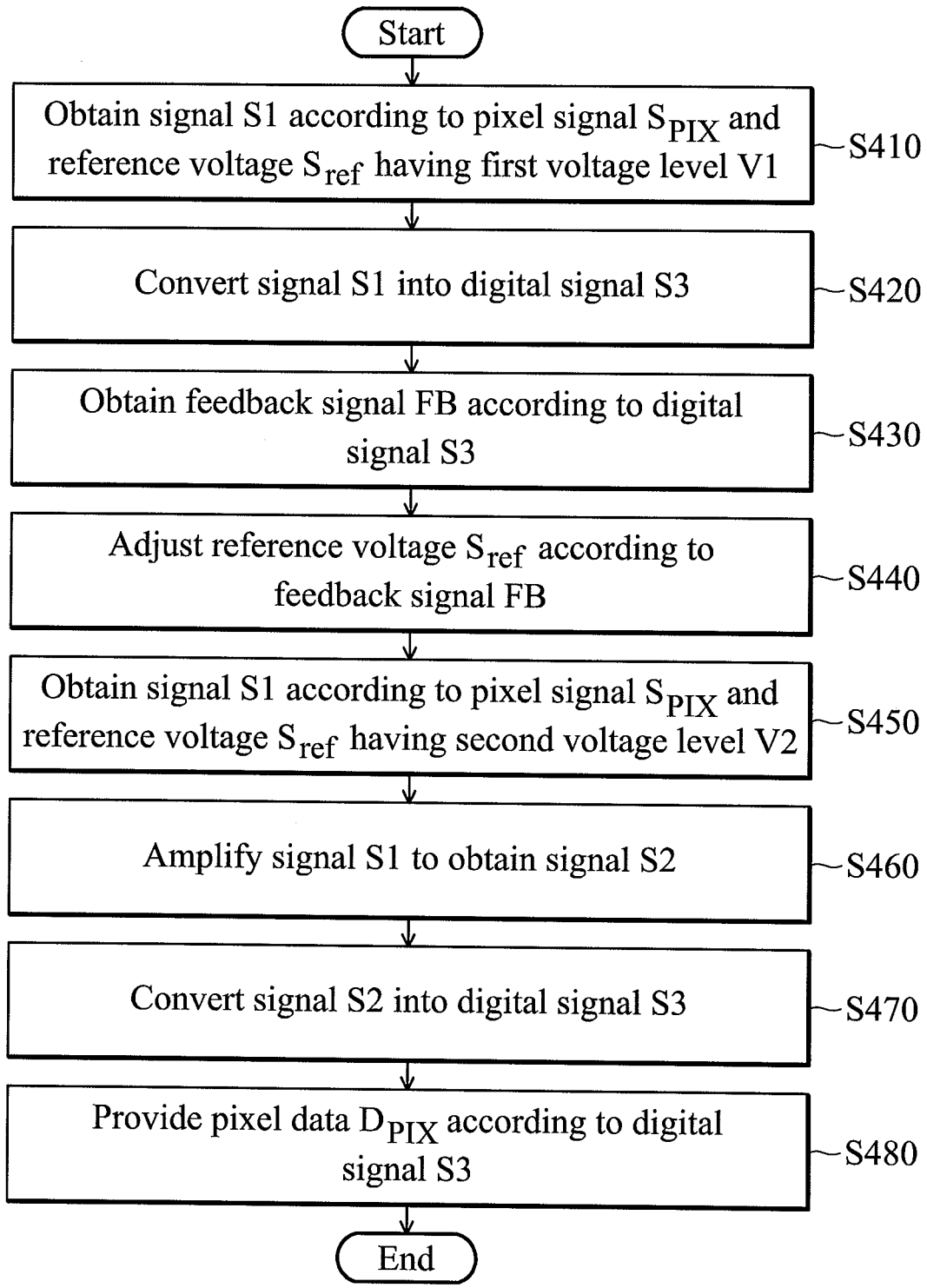
FIG. 4 shows an adjustment method for an image sensor according to an embodiment of the invention.

FIG. 4 shows an adjustment method for an image sensor according to an embodiment of the invention. Referring to FIG. 1 and FIG. 4 together, first, in step S410, the sense amplifier 120 obtains the signal S1 according to the pixel signal $S_{PIX}$ and the reference voltage $S_{ref}$ having the first voltage level V1. Next, in step S420, the ADC 140 converts the signal S2 into the digital signal S3, wherein the signal S2 is similar to the signal S1. Next, in step S430, the processor 150 provides the feedback signal FB to the voltage generator 160 according to the digital signal S3. Next, in step S440, the voltage generator 160 adjusts the reference voltage $S_{ref}$ to the second voltage level V2 according to the feedback signal FB, such that the reference voltage $S_{ref}$ has the second voltage level V2. Next, in step S450, the sense amplifier 120 re-obtains the signal 51 according to the pixel signal $S_{PIX}$ and the reference voltage $S_{ref}$ having the second voltage level V2. Next, in step S460, the gain amplifier 130 amplifies the signal S1 to obtain the signal S2 according to the gain signal Gain. Next, in step S470, the ADC 140 converts the amplified signal S2 into the digital signal S3. Next, in step S480, the processor 150 provides the pixel data $D_{PIX}$ having a sufficient signal range to other devices according to the digital signal S3 for subsequent processes. Therefore, by removing the DC component $S_{DC}$ caused by the background signal from the pixel signal $S_{PIX}$, the image sensor 100 can provide pixel data having a sufficient signal range. Moreover, the image sensor 100 can use the gain amplifier 130 to adjust the signal S2 suitably. Therefore, the pixel data Dm can have the satisfactory signal range without an additional amplifier.

While the invention has been described by way of example and in terms of the preferred embodiments, it is to be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. An image sensor, comprising:
   a pixel array;
   a sense amplifier, obtaining a first signal according to a pixel signal from the pixel array and a reference voltage, wherein the reference voltage has a first voltage level;
   an analog-to-digital converter, converting the first signal into a first digital signal;
   a processor, providing a feedback signal according to the first digital signal; and
   a voltage generator, adjusting the reference voltage to a second voltage level corresponding to the feedback signal,
   wherein the sense amplifier removes a direct current (DC) bias voltage from the pixel signal according to the reference signal having the second voltage level,
   wherein the sense amplifier comprises:
      an operational amplifier, having a non-inverting input terminal for receiving the pixel signal, an inverting input terminal for receiving the reference voltage, and an output terminal coupled to the analog-to-digital converter; and
      a capacitor coupled between the non-inverting input terminal and the output terminal of the operational amplifier.

2. The image sensor as claimed in claim 1, wherein the voltage generator is a digital-to-analog converter.

3. The image sensor as claimed in claim 1, wherein the sense amplifier obtains a second signal according to the pixel signal and the reference voltage having the second voltage level.

4. The image sensor as claimed in claim 3, wherein the DC bias voltage corresponds to a background signal of the pixel array, and the sense amplifier removes the DC bias voltage from the pixel signal to obtain the second signal.

5. The image sensor as claimed in claim 3, further comprising:
   a gain amplifier coupled between the sense amplifier and the analog-to-digital converter, amplifying the second signal.

6. The image sensor as claimed in claim 5, wherein the analog-to-digital converter converts the amplified second signal into a second digital signal, and the processor provides a pixel data according to the second digital signal.

7. An adjustment method for an image sensor, comprising:
   obtaining a first signal according to a pixel signal from a pixel array of the image sensor and a reference voltage having a first voltage level;
   converting the first signal into a first digital signal, by an analog-to-digital converter of the image sensor;
   obtaining a feedback signal according to the first digital signal;

adjusting the reference voltage to a second voltage level corresponding to the feedback signal, by a voltage generator of the image sensor; and removing a direct current (DC) bias voltage from the pixel signal according to the reference voltage having the second voltage level, wherein the first signal is provided by a sense amplifier of the image sensor, and the sense amplifier comprises:

an operational amplifier, having a non-inverting input terminal for receiving the pixel signal, an inverting input terminal for receiving the reference voltage, and an output terminal coupled to the analog-to-digital converter; and a capacitor coupled between the non-inverting input terminal and the output terminal of the operational amplifier.

8. The adjustment method as claimed in claim 7, further comprising:

obtaining a second signal according to the pixel signal and the reference voltage having the second voltage level.

9. The adjustment method as claimed in claim 7, wherein the voltage generator is a digital-to-analog converter.

10. The adjustment method as claimed in claim 8, wherein the second signal is provided by the sense amplifier of the sensor.

11. The adjustment method as claimed in claim 8, wherein the step of obtaining the second signal further comprises:

removing the DC bias voltage from the pixel signal, to obtain the second signal, wherein the DC bias voltage corresponds to a background signal of the pixel array.

12. The adjustment method as claimed in claim 8, further comprising: amplifying the second signal.

13. The adjustment method as claimed in claim 12, further comprising:

converting the second signal into a second digital signal; and obtaining a pixel data according to the second digital signal.

* * * * *